US012760790B2

(12) United States Patent
Wu

(10) Patent No.: US 12,760,790 B2
(45) Date of Patent: Oct. 13, 2026

(54) TRANSMISSION WITH A HOUSING PART AND A COVER

(71) Applicant: SEW-EURODRIVE GMBH & CO. KG, Bruchsal (DE)

(72) Inventor: Zili Wu, Tianjin (CN)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 127 days.

(21) Appl. No.: 18/694,443

(22) PCT Filed: Sep. 13, 2022

(86) PCT No.: PCT/EP2022/025427
§ 371 (c)(1),
(2) Date: Mar. 22, 2024

(87) PCT Pub. No.: WO2023/051947
PCT Pub. Date: Apr. 6, 2023

(65) Prior Publication Data

US 2024/0384785 A1 Nov. 21, 2024

(30) Foreign Application Priority Data

Sep. 29, 2021 (CN) .......................... 202111154025.3
Nov. 11, 2021 (DE) ..................... 10 2021 005 577.2

(51) Int. Cl.
*F16H 57/031* (2012.01)
*F16H 57/04* (2010.01)

(52) U.S. Cl.
CPC ....... *F16H 57/031* (2013.01); *F16H 57/0424* (2013.01); *F16H 57/0445* (2013.01);
(Continued)

(58) Field of Classification Search
CPC ............... F16H 57/031; F16H 57/0424; F16H 57/0445; F16H 57/0471
See application file for complete search history.

(56) References Cited

U.S. PATENT DOCUMENTS 2,699,841 A * 1/1955 Gunderson ........... F16H 57/031 184/6.12
2,838,958 A * 6/1958 Redman ................ F16H 57/031 74/606 R
(Continued)

FOREIGN PATENT DOCUMENTS

CN 212536610 U 2/2021
DE 8714166 U1 1/1988
(Continued)

OTHER PUBLICATIONS

Merriam-Webster, https://www.merriam-webster.com/dictionary/arrange.*
(Continued)

*Primary Examiner* — Minh Truong
(74) *Attorney, Agent, or Firm* — Carter, DeLuca & Farrell LLP

(57) ABSTRACT

A transmission includes a housing part and a cover. A bead which borders a surface region of the housing part is molded onto the housing part, and a precision-machined surface is formed on the bead. The cover is connected to the housing part, and a seal, e.g., a flat seal, which is arranged on the surface, is arranged between the cover and the surface. A spatial region is delimited by the cover and the surface region and the bead. A bearing cover is arranged in the spatial region, and the bearing cover is connected to the housing part and rests against another surface which is formed on an additional bead. The other surface has an interrupted configuration.

22 Claims, 3 Drawing Sheets

(52) U.S. Cl.
CPC ..... *F16H 57/0471* (2013.01); *F16H 57/0416* (2013.01); *F16H 57/0436* (2013.01)

(56) References Cited

U.S. PATENT DOCUMENTS

| | | | | | |
|---|---|---|---|---|---|
| 2,952,165 | A * | 9/1960 | Bade | F16H 1/20<br>74/606 R |
| 11,174,939 | B2 * | 11/2021 | Zanotti | F16H 57/0424 |
| 2020/0049248 | A1 * | 2/2020 | Chang | B62M 6/65 |
| 2021/0001712 | A1 | 1/2021 | Misu | |

FOREIGN PATENT DOCUMENTS

| | | | | |
|---|---|---|---|---|
| EP | 2411704 | B1 * | 12/2013 | F16H 57/021 |
| WO | WO-2010108601 | A1 * | 9/2010 | F16C 33/664 |
| WO | 2012/123044 | A1 | 9/2012 | |

OTHER PUBLICATIONS

International Report on Patentability issued in corresponding International Application No. PCT/EP2022/025427 dated Apr. 2, 2024, pp. 1-8, English Translation.

International Search Report issued in corresponding International Application No. PCT/EP2022/025427 dated Mar. 2, 2023, pp. 1-2, English Translation.

* cited by examiner

TRANSMISSION WITH A HOUSING PART AND A COVER

FIELD OF THE INVENTION

The present invention relates to a transmission with a housing part and a cover.

BACKGROUND INFORMATION

In certain conventional systems, lubricating oil is arranged in the interior of a transmission to lubricate the toothings which mesh with each other.

A transmission is described in Chinese Patent Document No. 212536610.

A device for supplying oil from a gearbox transmission housing containing an oil sump is described in German Patent Document No. 87 14 166.

SUMMARY

Example embodiments of the present invention provide a transmission which is as compact as possible.

According to example embodiments of the present invention, in a transmission having a housing part and a cover, a bead which borders a surface region of the housing part is molded onto the housing part, projecting, for example, on the surface of the housing part. For example, the bead is molded as a thickening of the housing part. A precision-machined surface, e.g., a flat surface arranged as a sealing surface, is formed on the bead, and the cover is connected to the housing part. A seal, e.g., a flat seal, which is arranged on the surface, is arranged between the cover and the surface. A spatial region is delimited by the cover and the surface region and the bead, and a bearing cover is arranged in the spatial region. The bearing cover is connected to the housing part and rests against another surface which is formed on an additional bead, e.g., as a flat and/or precision-machined other surface, and the other surface has an interrupted configuration.

Thus, by collecting the oil in the spatial region, which acts as an intermediate buffer reservoir, it is possible to efficiently carry out the dissipation of heat from the oil. This is because the spatial region has a flat configuration, and the cover can be provided with cooling fins. In this manner, good heat transfer from the oil to the environment can be provided. In addition, the conveyed airflow flows along the cover and thus improves heat dissipation.

Thus, high performance can be achieved with a small installation space for the transmission, meaning that the transmission can be compact.

According to example embodiments, the surface, e.g., the sealing surface, on which the cover rests extends completely uninterrupted in the circumferential direction around the axis of rotation of the intermediate shaft. Thus, sealing is efficient in an effective manner. The spatial region is thus also sealed off from the environment. In addition, the surface provides a good support for the cover or, respectively, the seal, so that the connection can be carried out with a high type of protection.

According to example embodiments, threaded bores are made in the surface, into which threaded bores screws are screwed, the screw heads of which press the cover towards the housing part. Thus, cost-effective fastening can be carried out. The threaded bores are aligned parallel to the axis of rotation of the intermediate shaft, thus, e.g., parallel to the normal direction of the flat surface.

According to example embodiments, the transmission has a rotatably mounted intermediate shaft, and the other surface has an interrupted configuration in the circumferential direction around the axis of rotation of the intermediate shaft, e.g., has a not completely circumferential configuration. Thus, the interruption region allows oil to flow through. Since the bearing cover axially delimits the outer ring of the first bearing of the intermediate shaft, e.g., in the direction of the axis of rotation of the intermediate shaft, oil thus flows through the interruption region to the first bearing of the transmission.

For example, two interruptions of the other surface are formed, which are diametrically opposite each other, e.g., in relation to the axis of rotation of the intermediate shaft. Oil thus flows through both interruption regions to the first bearing of the intermediate shaft, thus providing for an even further improved lubrication.

According to example embodiments, a cutout of the housing part, which cutout is arranged as a first oil channel, leads from the spatial region to a first bearing of the intermediate shaft through the region of the other surface, which region has an interrupted configuration. Thus, the lubrication of the first bearing of the intermediate shaft is improved. Thus, this bearing can also be arranged above the oil level and still be supplied with oil, at least when the transmission is in operation. The second bearing of the intermediate shaft is arranged in the oil sump of the transmission.

According to example embodiments, a cutout arranged as another oil channel is formed in the housing part, which cutout leads from the spatial region to a bearing of the driven shaft. Thus, the lubrication of the first bearing of the driven shaft is improved. Thus, this bearing can also be arranged above the oil level and still be supplied with oil, at least when the transmission is in operation. The second bearing of the driven shaft is arranged in the oil sump of the transmission.

According to example embodiments, a cutout arranged as a third oil channel is formed in the housing part, which cutout leads from the spatial region to a first bearing of the driving shaft. For example, the first bearing is arranged as a double bearing, and, for example, the cutout arranged as the third oil channel opens centrally between the two bearings of the double bearing of the driving shaft. Thus, the bearings can be accommodated in a bearing cup, which can be inserted pre-assembled into a cutout in the housing part with the bearing tension set. Although the bearings are difficult to access for oil from the oil sump, they are well supplied with oil due to the supply via the third oil channel.

According to example embodiments, the cutout arranged as a third oil channel has a branch formed in the housing part, which branch opens between the first bearing and a second bearing of the driving shaft. Thus, a sufficient supply of all bearings of the driving shaft can be ensured.

According to example embodiments, the intermediate shaft drives a suction pump, which conveys oil into the spatial region via an oil line and/or via a channel formed in the housing part. Thus, the suction pump is passively driven.

According to example embodiments, the suction pump is arranged on the side of a second bearing of the intermediate shaft, which side faces away from the first bearing of the intermediate shaft. Thus, the suction pump is arranged in the oil sump of the transmission, which thus provides for suction with little effort.

According to example embodiments, the first bearing of the intermediate shaft and the first bearing of the driven shaft are arranged above the oil level when the transmission is at a permanent standstill. Thus, the oil channels formed in the housing part, i.e., inside the housing part, make it possible to achieve a sufficient supply of lubricating oil.

According to example embodiments, the driving shaft is connected to a fan in a rotationally fixed manner, and the air flow conveyed by the fan is guided along the cooling fins of the cover. Thus, cooling can be carried out efficiently, and, thus, high performance can be achieved with a small installation space for the transmission, i.e., the transmission can be ARRANGED in a compact manner.

According to example embodiments, a fan hood surrounding the fan is detachably connected to the housing part, and, for example, the fan hood directs the air flow conveyed by the fan along the cooling fins of the cover. Thus, heat dissipation can be carried out efficiently.

According to example embodiments, the cooling fins are aligned parallel to the axis of rotation of the driving shaft. Thus, efficient heat dissipation can be carried out.

According to example embodiments, foot regions are molded onto the housing part, which foot regions are arranged on the side of the housing part facing away from the cover. Thus, the driven shaft can project on the side facing away from the foot parts, e.g., oriented vertically if the foot parts are placed on a horizontal floor surface.

Further features and aspects of example embodiments of the present invention are explained in more detail below with reference to the appended schematic Figures.

DETAILED DESCRIPTION

Figure 1:
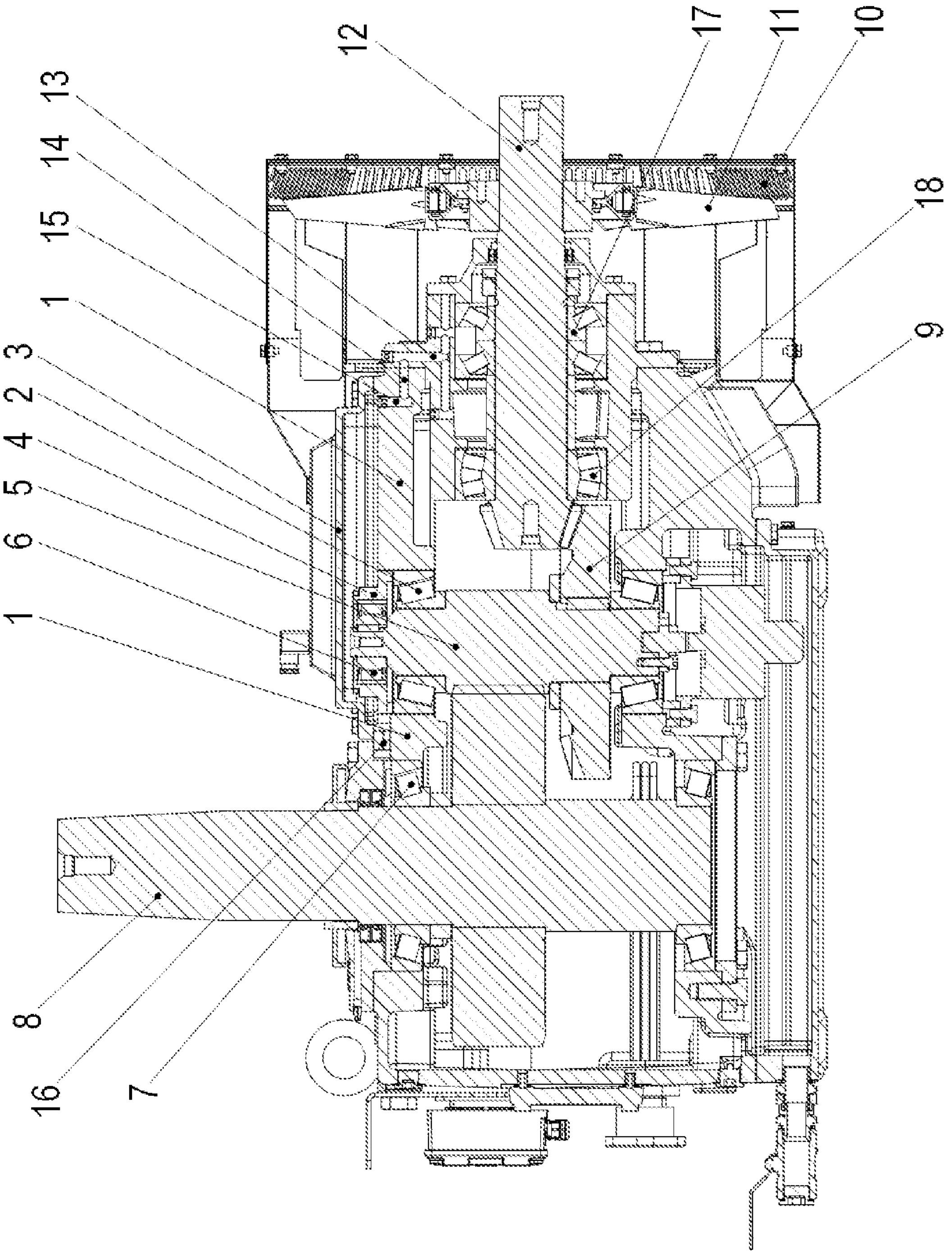
FIG. 1 is a cross-sectional view of a transmission having a housing part 1.
Figure 2:
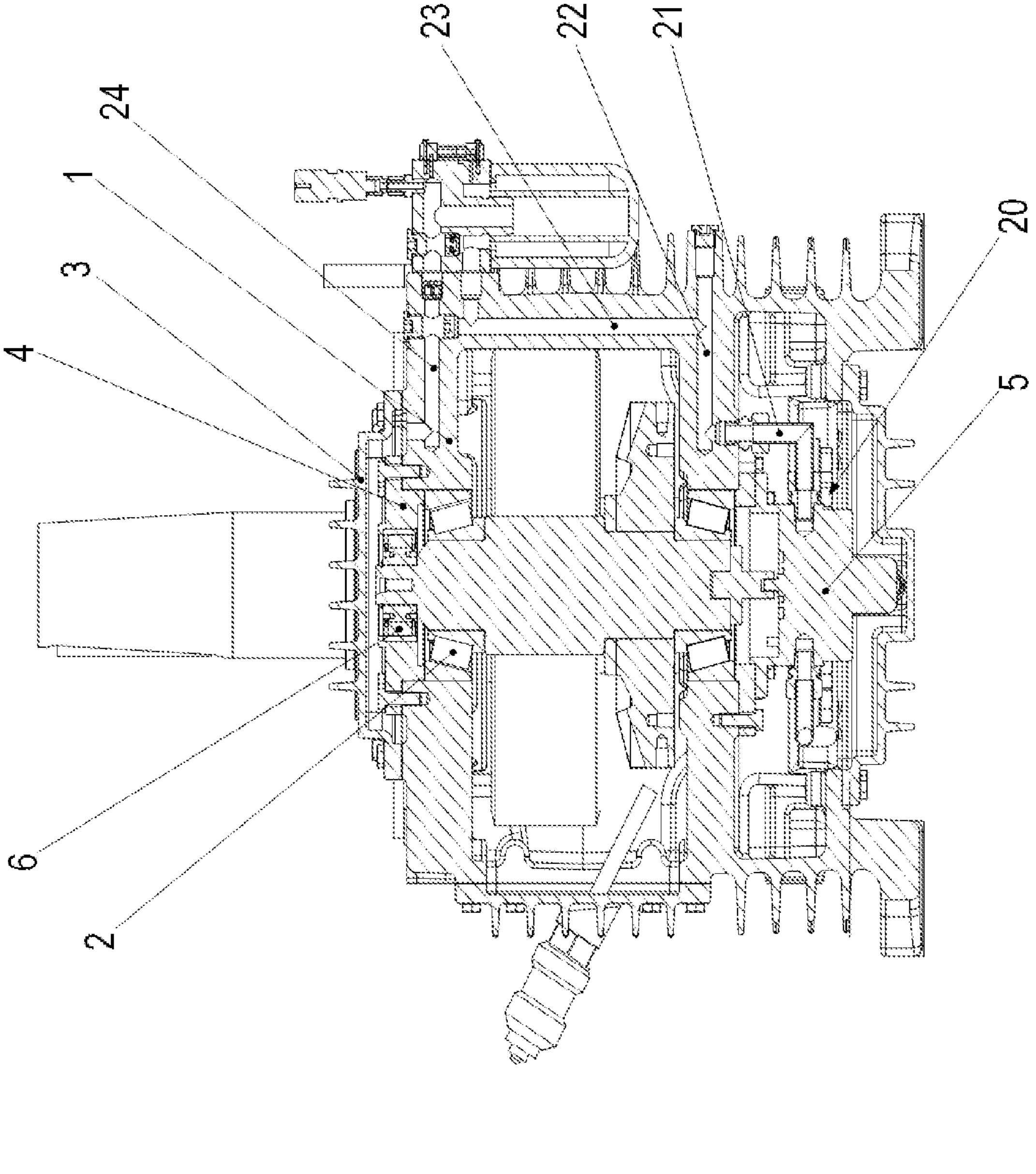
FIG. 2 is a longitudinal cross-sectional view of the transmission.
Figure 3:
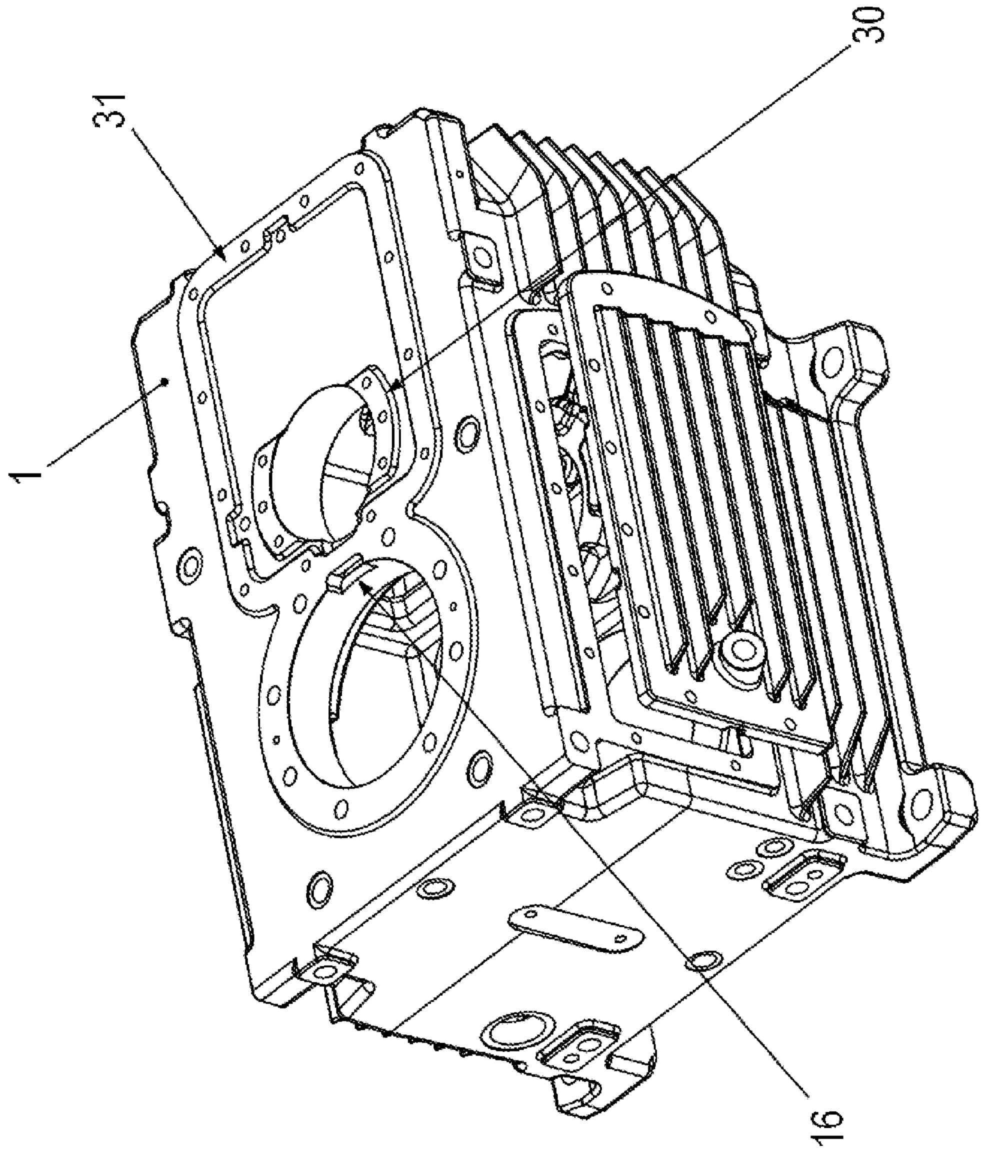
FIG. 3 is a perspective view of the transmission.

As illustrated in the Figures, the transmission has a driving shaft 12, the bearings of which are accommodated in a bearing flange which is connected to the housing part 1 via screws.

The driving shaft 12, which is arranged as a toothed pinion, meshes with a gear 9, which is connected to an intermediate shaft 5 in a rotationally fixed manner.

The intermediate shaft 5 is, for example, aligned vertically.

The driving shaft 12 is aligned perpendicular to the intermediate shaft 5, e.g., because the driving transmission stage of the transmission is an angular transmission stage.

Another toothing, which is incorporated directly on the intermediate shaft 5 or which is provided on a gear which is connected to the intermediate shaft 5 in a rotationally fixed manner, meshes with another gear which is connected to the driven shaft 8 in a rotationally fixed manner.

The driven shaft 8 is aligned parallel to the intermediate shaft 5.

At least one of the bearings of the driven shaft is accommodated in the housing part 1.

A bearing 2 of the intermediate shaft 5 is also accommodated in the housing part.

A bead is molded onto housing part 1, e.g., on the top side of the housing part 1 as seen in the vertical direction, which bead projects in particular in the vertical direction and borders a surface region of the housing part 1, on which bead a precision-machined surface acting as a sealing surface 31 is provided, on which a cover 3 is placed, and a seal arranged between the cover 3 and the sealing surface 31, e.g., a flat seal, seals the spatial region covered by the cover and formed between the cover 3 and the housing part 1.

A suction pump 20 driven by the intermediate shaft 5 draws in the oil provided in the interior of the transmission, e.g., from the oil sump, and conveys the oil through the oil line 21, which leads to an oil channel arranged in the housing part 1.

This oil channel is, for example, composed of radial bores 22 and axial bores 23, 24 in relation to the axis of rotation of the intermediate shaft and opens into the spatial region.

Thus, the spatial region forms an oil reservoir, e.g., an intermediate buffer. The bearings of the driven shaft 8 on the one hand and the bearings of the intermediate shaft 5 and the driving shaft 12 on the other are supplied from the spatial region via additional channels.

The cover 3 has cooling fins on its outer side so that the heat of the oil in the spatial region is efficiently dissipated to the environment.

A bearing cover 4 is placed on another sealing surface 30 of the housing part 4, which other sealing surface 30 is also provided on a bead molded onto the housing part 1 and projects, for example, in the vertical direction and borders a partial region of the surface region of the housing part 1. This other sealing surface 30 is precision-machined. The bearing cover 4 is placed on this other sealing surface 30 and fastened to the housing part 4 via screws which pass through the bearing cover 4 and are screwed into threaded bores in the other sealing surface.

A seal, e.g., a flat seal, can optionally be arranged between the bearing cover 4 and the sealing surface 30. However, a leak on the other sealing surface is harmless, since oil seeping through flows down to the bearings of the intermediate shaft 5 and thus supports the lubrication and cooling of these bearings.

For example, the bearing cover 4 accommodates an adjustment bearing 6 which allows oil to pass through and thus provides for a flow of oil from the spatial region through the adjustment bearing 6 to the bearing 2 located axially thereunder in the direction of the axis of rotation of the intermediate shaft 5. This provides for the lubrication and cooling of the bearing 2.

Alternatively or additionally, an additional oil flow from the spatial region to the bearing 2 is made possible in that the other sealing surface 30 is not completely circumferential around the axis of rotation of the intermediate shaft 5, but has an interrupted configuration. In this interruption region, a distance is created between the bearing cover 4 and the housing part 1, so that oil can enter and penetrate to the bearing 2 of the intermediate shaft 5, e.g., through the bearing cover 4.

Threaded bores are also made in the sealing surface 31, into which screws are screwed, the screw heads of which press the cover 3 towards the sealing surface 31 and which screws project through the cover 4.

Another channel for lubricating oil is provided in housing part 1. This other channel opens, on the one hand, into the spatial region and, on the other hand, into a region which is arranged centrally between the two bearings of a double bearing 17 of the driving shaft 12. Thus, improved lubrication of this double bearing is made possible.

The double bearing 17 is, for example, accommodated in a bearing cup, which is connected to the housing part 1 via screws. However, the bearing cup projects from the housing part 1 towards the environment, so that, with regard to lubricating oil from the oil sump, the double bearing 17 would be inadequately supplied with lubricant without the lubrication supplied through the other channel.

The vertical projection of the double bearing 17 into a plane which contains the axis of rotation of the driving shaft 12 and whose normal direction is aligned parallel to the axis of rotation of the intermediate shaft 5 is arranged outside the vertical projection of the housing part 1 into this plane or overlaps with the vertical projection of the housing part 1 into this plane. For this reason, it is more difficult for the lubricating oil from the oil sump to access the double bearing 17. However, lubricating oil is fed directly from the spatial region through the other channel, thus ensuring the lubrication of the double bearing 17.

The sealing surface 31, on which the cover 3 rests, extends completely uninterrupted in the circumferential direction around the intermediate shaft 5. Thus, a high type of protection can be achieved.

A fan 11 is connected to the driving shaft 12 in a rotationally fixed manner at the region of the driving shaft 12 which region projects towards the environment. A fan hood 10 surrounds the fan 11 and is detachably connected to the housing part 1.

The air flow conveyed by the fan wheel 11 is directed by the fan hood 10 such that it flows along the cooling fins molded onto the cover 3, which project towards the environment and extend parallel to the axis of rotation of the driving shaft.

In this manner, improved heat dissipation can be achieved and the heat of the oil in the spatial region can thus be dissipated.

The spatial region is arranged as flat as possible so that almost the entire length of the cover 3 can be used to cool the oil.

For example, the extension of the spatial region in the direction of the axis of rotation of the driving shaft is greater, e.g., at least ten times greater, than in the direction of the axis of rotation of the intermediate shaft 5.

The housing part 1 also has cooling fins on its outer surface, which projects outwards, so that the dissipation of heat from the transmission is improved.

In addition, on at least one side wall of the housing part 1, a cover part covers a cutout in the side wall, and the cover part also has cooling fins on its outer surface.

The housing part 1 is, for example, produced in two pieces, i.e., composed of a bottom part and an upper part placed thereon.

Additionally, according to example embodiments, instead of the adjustment bearings 6, which are arranged as rolling bearings, e.g., cylindrical roller bearings, no bearing is provided, but only a continuous cutout in the bearing cover 4 is provided, e.g., so that a flow of oil from the spatial region to the bearing 2 is permitted.

LIST OF REFERENCE NUMERALS

1 Housing part
2 Bearing
3 Cover
4 Bearing cover
5 Intermediate shaft
6 Adjustment bearing
7 Bearing
8 Driven shaft
9 Gear
10 Fan hood
11 Fan
12 Driving shaft
13 Radial bore
14 Axial bore
15 Radial bore
16 Channel for oil
17 Double bearing
18 Double bearing
20 Suction pump, e.g., passive suction pump
21 Oil line
22 Radial bore in relation to the axis of rotation of the intermediate shaft
23 Axial bore in relation to the axis of rotation of the intermediate shaft
24 Radial bore in relation to the axis of rotation of the intermediate shaft
30 Sealing surface for bearing covers 4
31 Sealing surface for covers 3

The invention claimed is:

1. A transmission, comprising:

a housing part including a bead that borders a surface region of the housing part and is arranged as a molded portion of the housing part, a precision-machined surface being arranged on the bead;

a cover connected to the housing part;

a seal arranged on the precision-machined surface between the cover and the precision-machined surface; and a bearing cover;

wherein a spatial region is delimited by the cover, the surface region, and the bead, the bearing cover being arranged in the spatial region, being connected to the housing part, and resting against a further surface arranged on an additional bead, the additional bead being interrupted.

2. The transmission according to claim 1, wherein the bead projects from a surface of the housing part.

3. The transmission according to claim 1, wherein the bead is arranged as a molded thickening of the housing part.

4. The transmission according to claim 1, wherein the precision-machined surface is arranged as a flat surface and a sealing surface.

5. The transmission according to claim 1, wherein the seal includes a flat seal.

6. The transmission according to claim 1, wherein the further surface is arranged as a flat surface and/or a precision-machined surface.

7. The transmission according to claim 1, wherein the precision-machined surface includes threaded bores, screws that are screwed into the threaded bores pressing the cover toward the housing part.

8. The transmission according to claim 1, further comprising a rotatably mounted intermediate shaft, the further surface being interrupted in a circumferential direction around an axis of rotation of the intermediate shaft.

9. The transmission according to claim 8, wherein the cover rests on the sealing surface, and the sealing surface extends completely uninterrupted in the circumferential direction around the intermediate shaft.

10. The transmission according to claim 8, wherein a first oil channel leads from the spatial region to a first bearing of the intermediate shaft through a region of the other surface.

11. The transmission according to claim 10, wherein another oil channel is arranged in the housing part and leads from the spatial region to a bearing of a driven shaft of the transmission.

12. The transmission according to claim 11, wherein a third oil channel is arranged in the housing part and leads from the spatial region to a first bearing of a driving shaft of the transmission.

13. The transmission according to claim 12, wherein the first bearing of the driving shaft is arranged as a double bearing and/or the third oil channel opens centrally between two bearings of the double bearing.

14. The transmission according to claim 8, wherein the intermediate shaft is adapted to drive a suction pump that is adapted to deliver oil into the spatial region via an oil line and/or via a channel formed in the housing part.

15. The transmission according to claim 14, wherein the suction pump is arranged on a side of a second bearing of the intermediate shaft that faces away from a first bearing of the intermediate shaft.

16. The transmission according to claim 15, wherein the first bearing of the intermediate shaft and a first bearing of a driven shaft of the transmission are arranged above an oil level of the transmission when the transmission is at a permanent standstill.

17. The transmission according to claim 12, wherein the third oil channel includes a branch arranged in the housing part that opens between the first bearing of the driving shaft and a second bearing of the driving shaft.

18. The transmission according to claim 1, wherein a driving shaft of the transmission is connected to a fan in a rotationally fixed manner, the fan adapted to convey an airflow guided along cooling fins of the cover.

19. The transmission according to claim 18, wherein a fan hood surrounding the fan is detachably connected to the housing part.

20. The transmission according to claim 19, wherein the fan hood is adapted to direct the air flow conveyed by the fan along the cooling fins of the cover.

21. The transmission according to claim 18, wherein the cooling fins are aligned parallel to an axis of rotation of the driving shaft.

22. The transmission according to claim 1, wherein molded foot regions of the housing part, are arranged on a side of the housing part facing away from the cover.

* * * * *